United States Patent [19]

Carpenter

[11] Patent Number: 4,910,835
[45] Date of Patent: Mar. 27, 1990

[54] CORD RETAINER

[75] Inventor: Bruce R. Carpenter, Oakville, Canada

[73] Assignee: Canadiana Outdoor Products Inc., Ontario, Canada

[21] Appl. No.: 278,984

[22] Filed: Dec. 2, 1988

[51] Int. Cl.⁴ ............................................. F16G 11/00
[52] U.S. Cl. .................................. 24/129 R; 24/16 PB
[58] Field of Search ................... 248/51, 52; 24/16 R, 24/16 PB, 17 AP, 30.5 R, 30.5 P, 129 R, 129 D

[56] References Cited

U.S. PATENT DOCUMENTS

| 3,130,462 | 4/1964 | Mitchell | 24/16 PB |
| 3,593,950 | 7/1971 | Tetzlaff | 248/52 |
| 4,752,054 | 6/1988 | Jonsson | 248/51 |
| 4,774,742 | 10/1988 | Johnson | 24/129 R |

FOREIGN PATENT DOCUMENTS

| 226579 | 8/1962 | Austria | 24/129 R |
| 680133 | 8/1939 | Fed. Rep. of Germany | 24/17 AP |
| 917217 | 8/1954 | Fed. Rep. of Germany | 24/30.5 P |
| 360840 | 4/1962 | Switzerland | 24/16 PB |
| 381603 | 10/1964 | Switzerland | 24/16 PB |
| 1023438 | 3/1966 | United Kingdom | 24/16 PB |

Primary Examiner—James R. Brittain
Attorney, Agent, or Firm—Kenneth M. Garrett

[57] ABSTRACT

A retainer for an electrical appliance cord comprises a buckle through which a bight of the cord may be passed, and a hook located above the buckle. The hook includes a cross bar aligned with the major axis of the buckle opening and a shank which locates the cross bar forwardly of the buckle opening, and around which the bight loops. The cross bar is desirably shaped to urge the cord when under tension towards the shank.

3 Claims, 1 Drawing Sheet

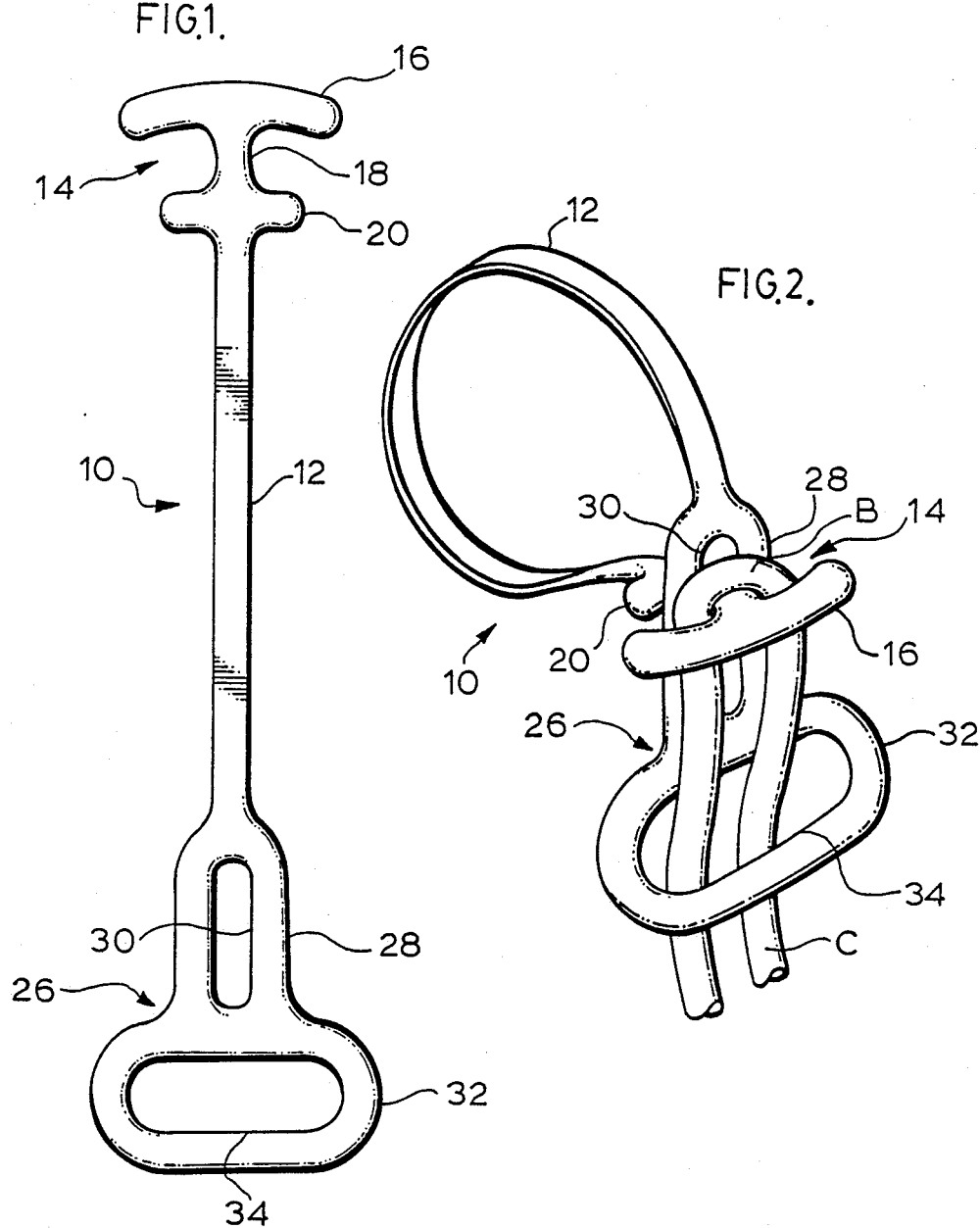

CORD RETAINER

FIELD OF INVENTION

This invention is directed to a retainer and strain relief for use with cords.

It is particularly described with reference to electrical cords used with various appliances, but it is not necessarily restricted thereto.

BACKGROUND OF INVENTION

In electrical appliances powered from an external source, an electrical connection to the appliance is usually made at a plug-socket connector. Strain on the cord will often pull the connector apart; the effect of this may vary from being a simple nuisance to being hazardous. Even in static apparatus such as freezers, a plug-socket connection be accidentally pulled apart, with expensive and noisome consequences. Not infrequently persons will resort to impromptu arrangements such as tying of cord ends together, or wrapping a cord end around a handle of the appliance, but these are seldom satisfactory. While various cord retainers have been commercially adopted for lawnmowers, they generally necessitate attachment to the handle of the lawnmower before this is assembled to the lawnmower.

It is an object of the invention to provide a strain relief for cords.

It is another object of the invention to provide a strain relief for cords that may be readily attached to or detached from an apparatus, including lawnmower handles.

It is a further object of the invention to provide a simple structure that is economically produced and reliable in use.

It is yet another object of the invention to provide a strain relief to which the cord is readily attached to or detached from.

SUMMARY OF INVENTION

In accordance with one embodiment of the invention, a cord retainer comprises wall means defining a buckle having an aperture through which the bight of a cord may be freely passed, and a hook means. The hook means comprises a bar portion and a central shank portion connected together in a T-shape, and is supported from the wall means forwardly of the plane of the aperture and on one transverse side thereof with the bar portion generally aligned with a major dimension of the aperture. The hook means is proportioned to receive the bight of the cord looped over the shank portion, with the cord trapped between the bar portion and the wall means.

Preferably the bar portion is shaped so as to urge the cord towards the shank portion as a strain is applied to the cord.

In accordance with a preferred aspect of the invention the wall means defines a further buckle having an elongated opening at right angles to the major dimension of the above mentioned bight receiving aperture, and in the plane thereof. The shank of the hook means is secured to the wall means by a flexible strap secured to the wall means at the end thereof remote from the bight receiving aperture. The bar portion is insertable through this further buckle opening by a simultaneous looping and twisting of the strap, so capturing the bar portion and forming a closed loop by which the retainer may be secured to, for example, the handle of an apparatus. Where it is desired that the closed loop not constrict about the object to which the restrainer is attached, the diameter of the loop may be controlled by providing the strap with a stop which interfers with the wall means to restrict the passage of the strap through the further buckle opening.

Preferably the stop will be spaced from the bar portion of the hook by a distance which will permit the bight of the cord to be resiliently squeezed between the wall means and the bar portion.

These foregoing objects and aspects of the invention, together with other objects, aspects and advantages thereof will be more apparent from the following description of a preferred embodiment thereof, taken in conjunction with the following drawings.

BRIEF DESCRIPTION OF THE DRAWINGS

FIG. 1—is a plan view of a cord retainer in accordance with the invention in elongated position;

FIG. 2—shows in perspective view the cord retainer of FIG. 1 formed into a closed loop, with a cord attached thereto.

DESCRIPTION OF THE PREFERRED EMBODIMENT

Considering the drawings in detail, a cord retainer constricted in accordance with the invention is identified therein generally by the numeral 10, and comprises an axially elongated strap 12 having at one axial end thereof a hook 14. Hook 14 comprises a cross-bar 16 and a shank 18 connecting the cross-bar centrally to strap 12. At the juncture of strap 12 and shank 18 there is provided a protuberance 20 which may otherwise be referred to as stop 20 in view of its function as will be subsequently referred to.

At the other axial end of strap 12 there is provided wall structure 26 comprising a first buckle 28 having an axially elongated opening 30 and outwardly adjacent thereto a second buckle 32 having a transversely elongated opening 34, with opening 34 being somewhat larger than opening 30.

Cord retainer 12 is conveniently formed as a unitary molding from a tough, resiliently deformable thermoplastic material. The various dimensions are not critical. Strap 12 will be of relatively small cross section to permit the strap to be formed into a closed loop 40, while simultaneously permitting it to twist about its axis through 90 degrees to permit cross-bar 16 to be engaged with, or disenagaged from, buckle 28. Buckle 32 will permit the relatively free threading of the bight B of a cord C therethrough, so as to permit the bight to be hooked over shank 18 behind cross-bar 16. The length of shank 18 will be such that when bight B is tightly looped over the shank, cord C will be somewhat compressed between the wall structure 26 defining buckle 28 and cross-bar 16. Cross-bar 16 is broadly V shaped in plan form, whereby as strain is exerted on cord C, the bight B will tend to close thereby increasing the grip on the cord provided by retainer 10.

It will be apparent from the foregoing description that other than in regard to strap 12, the component parts of retainer 10 should resist deformation under strain forces to which they will normally be subject and that accordingly the cross-sectional area of these portions will be increased relative to the cross sectional are of strap 12.

It will be apparent that the invention may be embodied in many different forms some of which may be preferred according to particular circumstances and it is intended that all such embodiments should be covered by the spirit of the claims appended hereto.

I claim:

1. Power cord retainer comprising a thick generally planar body formable into a closed loop, said body comprising:

an axially elongated strap having axially opposed ends;

a hook secured to one said end of said strap, such hook comprising a cross bar portion, a shank portion centrally connecting said cross bar portion to said strap and stop means locating at the intersection of said shank portion and said strap; and wall structure connecting to the other end of said strap; said wall structure defining a first buckle having a first axially elongated opening and outwardly proximate thereto a second buckle having a second opening elongated in the transverse direction and having a cross sectional area significantly larger than the cross sectional area of said strap;

said first buckle opening permitting the passage of said cross bar portion therethrough when rotated into a plane normal to the plane of said body so as to form said closed loop;

said shank having a length significantly greater than the thickness of said body to permit a substantial clearance between said wall structure of said first buckle and said cross bar portion when said closed loop is formed;

said second buckle opening permitting the free passage of the bight of a cord therethrough, and said cross bar portion having a length permitting the capture of a said bight of cord therebehind.

2. Cord retainer as defined in claim 1, wherein said body is a unitary molded structure.

3. Cord retainer as defined in claim 2, wherein said strap has a smaller cross-sectional area than said hook and wall structure to permit said strap to be twisted along its axis by at least 90 degrees while being simultaneously formed into a closed loop.

* * * * *